United States Patent [19]

Collonia

[11] 4,157,126
[45] Jun. 5, 1979

[54] SYSTEM FOR REGULATING THE TRAVELING SPEED OF A MOTOR VEHICLE

[76] Inventor: Harald Collonia, Ölmühlweg 13, Königstein, Taunus, Fed. Rep. of Germany, 6240

[21] Appl. No.: 854,620

[22] Filed: Nov. 25, 1977

[30] Foreign Application Priority Data

Dec. 1, 1976 [DE] Fed. Rep. of Germany ....... 2654455

[51] Int. Cl.$^2$ ............................................... B60K 31/00
[52] U.S. Cl. .................. 180/105 E; 123/102; 361/242
[58] Field of Search .................. 180/105 E; 123/102; 361/51, 242

[56] References Cited

U.S. PATENT DOCUMENTS

| | | | |
|---|---|---|---|
| 3,895,684 | 7/1975 | Takeshi et al. | 180/105 E |
| 3,983,954 | 10/1976 | Noddings et al. | 180/105 E |

Primary Examiner—Joseph F. Peters, Jr.
Assistant Examiner—Donn McGiehan
Attorney, Agent, or Firm—Otto John Munz

[57] ABSTRACT

A system for regulating the traveling speed of a motor vehicle includes a comparator producing an output signal corresponding to the difference between a sensed speed signal and a reference speed signal, a control device responsive to the output signal from the comparator for controlling the proportion of fuel-air mixture supplied to an engine in the motor vehicle, and a selective delay circuit coupled between the comparator and the control device for delaying the supply of the output signal from the comparator to the control device when the amplitude of the output signal is above a predetermined level and for supplying output signals having an amplitude below the predetermined level directly to the control device such that the system will respond quickly to variations in sensed speed occurring from normal load conditions while providing a smooth transition when the desired speed is changed.

5 Claims, 2 Drawing Figures

SYSTEM FOR REGULATING THE TRAVELING SPEED OF A MOTOR VEHICLE

BACKGROUND OF THE INVENTION

1. Field of the Invention

The present invention pertains to speed regulation and, more particularly, to a system for regulating the traveling speed of a motor vehicle by controlling the proportion of fuel-air mixture supplied to an engine in the motor vehicle in accordance with deviation of the actual traveling speed of the motor vehicle from a desired speed.

2. Discussion of the Prior Art

Many systems for regulating the traveling speed of a motor vehicle in order to automatically maintain the speed of the motor vehicle constant are known in the prior art, and it is desirable in such systems that the change in actual traveling speed be very small in response to load variations, such as those resulting from changes in the level of the road along with a motor vehicle is traveling. Additionally, such systems are preferably operable such that at the initiation of use of the system, an adjusting element cooperating with the engine is operated by a control device to be placed in the position required to control the operation of the vehicle as quickly as possible in order to assure a rapid transition from the traveling speed controlled by the driver to the automatically regulated traveling speed. In order to provide the latter feature, the system must have a high adjustment speed; however, such a high adjustment speed has the disadvantage of causing jerky or abrupt transition when the speed at which it is desired for the motor vehicle to travel is changed by the driver since, in this case, the adjustment element is initially brought into the full throttle position and then returned to the position required for maintenance of the desired speed. In order to overcome the jerky transition provided by prior art systems producing a quick take-over from manual to automatic operation, the adjustment response of such systems has been reduced thereby producing an undesired compromise between the desired response requirements for normal load variations and changes in desired speed.

SUMMARY OF THE INVENTION

Accordingly, it is a primary object of the present invention to overcome the above-mentioned disadvantages of the prior art by providing a system for regulating the traveling speed of motor vehicles in a manner whereby a control device is responsive directly to small deviations in an output signal occasioned by normal load conditions while the response of the control device to output signals representative of an abrupt change in the desired speed is delayed to provide a smooth transition.

Another object of the present invention is to utilize a selective delay circuit between a comparator providing an output signal corresponding to the difference between a sensed speed signal and a reference speed signal and a control device responsive to the output signal, the delay circuit transmitting to the control device any output signal below a predetermined level without delay while output signals above the predetermined level are delayed by the circuit.

The present invention has an additional object in that a control device for regulating the speed of a motor vehicle is operated in such a manner that, for abrupt changes, the control device initially begins to eliminate the change with high adjustment speed (fast response) and, after partial response, completes the regulating process with a low adjustment speed (slow response) thereby producing a smooth transition.

Yet a further object of the present invention is to utilize a bootstrap circuit or a Miller integrator between a comparator providing an output signal corresponding to the difference between a sensed speed signal and a reference speed signal and a control device to provide a smooth transition for output signals above a predetermined amplitude.

Some of the advantages of the present invention over the prior art are that the system for regulating the traveling speed of a motor vehicle in accordance with the present invention provides desired response for normal load variations as well as for abrupt changes in desired speeds without sacrificing one for the other, and the smooth transition can be provided inexpensively with a reduced number of additional circuitry components.

The present invention is generally characterized in a system for regulating the traveling speed of a motor vehicle including a comparator for comparing an electrical sensed speed signal representative of the actual traveling speed of the motor vehicle and an electrical reference speed signal representative of a desired traveling speed of the motor vehicle and producing an output signal corresponding to the difference between the sensed speed signal and the reference speed signal, control device responsive to the output signal for controlling the traveling speed of the motor vehicle, and a selective delay circuit coupled between the comparator and the control device for delaying the supply of the output signal to the control device when the amplitude of the output signal is above a predetermined level and for supplying the output signal directly to the control device when the amplitude of the output signal is below the predetermined level whereby a smooth transition is provided when the desired speed is changed.

Other objects and advantages of the present invention will become apparent from the following description of the preferred embodiment taken in conjunction with the accompanying drawings.

DESCRIPTION OF THE PREFERRED EMBODIMENT

Figure 1:
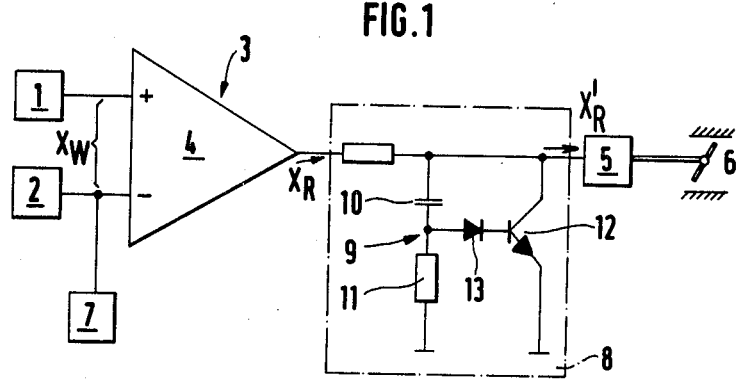
FIG. 1 is a schematic diagram of a system for regulating the traveling speed of a motor vehicle according to the present invention.

A system for regulating the traveling speed of a motor vehicle according to the present invention is shown in FIG. 1 and includes a device 1 responsive to the actual speed of the motor vehicle to generate a sensed speed signal, a device 2 for generating a reference speed signal representative of the desired speed of travel for the motor vehicle and a comparator 3 in the form of an operational amplifier 4 having a non-inverting input receiving the sensed speed signal from device 1 and an inverting input receiving the reference speed signal from device 2. Operational amplifier 4 operates as a comparator or differential amplifier to provide an output signal corresponding to the difference between the sensed speed signal and the reference speed signal to a control device 5 which controls the traveling speed of the motor vehicle. For example, the control device 5 can include a suitable pneumatic or electrical drive (not shown) for adjusting a throttle valve 6 controlling the fuel-air mixture supplied to an engine in the motor vehicle.

While not required in the system of the present invention, it is advantageous to utilize a frequency generator 7 to supply a constant frequency, sinusoidal signal to the inverting input of operational amplifier 4 along with the reference speed signal such that the sinusoidal signal is additively superposed on the differences Xw between the sensed speed and reference speed signals. By adding the sinusoidal signal to the difference Xw, the comparator 3 is operated in a manner such that the amplification of operational amplifier 4 steadily increases or decreases non-linearly between a maximum and a minimum as is highly desirable for use in regulating the speed of travel of motor vehicles.

A selective delay circuit 8 is coupled between the comparator 3 and the control device 5 and can be formed of any suitable circuitry to perform the function of supplying the output signal $X_R$ of the operational amplifier 4 directly to the control device 5 when the output signal is below a predetermined amplitude and of delaying the output signal $X_R$ when the output signal is above the predetermined amplitude. By delay is meant the amplitude of the output signal is reached after a time delay, preferably by a gradual increase. For example, delay circuit 8 can take the form of a bootstrap circuit or a Miller integrator. Specifically in FIG. 1, the delay circuit is shown as including a voltage divider 9 formed of the series connection of a capacitor 10 and a resistor 11 between the input to the control device 5 and a reference potential and an NPN transistor 12 having a base connected with the junction of capacitor 10 and resistor 11 via at least one diode 13, an emitter connected to the reference potential and a collector connected to the input of the control device 5.

Figure 2:
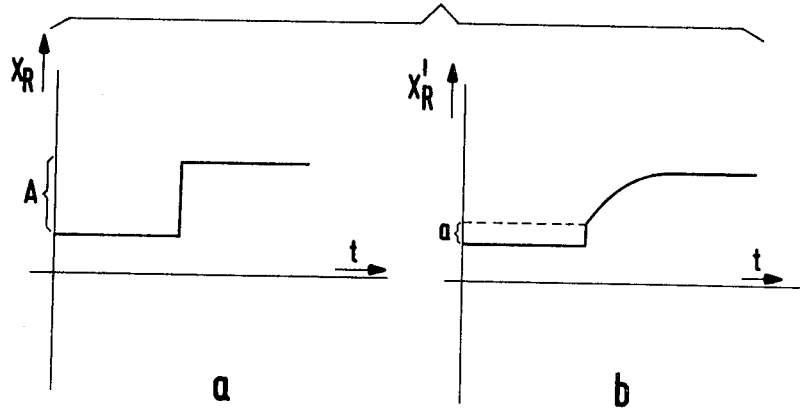
FIG. 2a is a graphic diagram of the output signal of the comparator of FIG. 1.
FIG. 2b is a graphic diagram of the signal supplied to the control device after transformation by the selective delay circuit of FIG. 1.

The operation of the delay circuit 8 in the system according to the present invention will be described with reference to FIG. 2 wherein the output signal $X_R$ from operational amplifier 4 is shown in FIG. 2a and, for exemplary purposes, has a step or pulse shape corresponding to an abrupt change in there reference speed. The signal $X_R{}^1$ supplied to control device 5 is shown in FIG. 2b and gradually reaches the amplitude of the output signal $X_R$ such that the motor vehicle is smoothly increased in speed by gradually opening the throttle 6 rather than permitting the throttle to be immediately opened in direct response to the step increase A in the output signal $X_R$. As illustrated, the portion "a" of the step increase A is supplied directly to the control device 5 without delay; however, the portion of the output signal above the predetermined level "a" is subject to an exponential delay to provide the desired smooth transition when the reference speed is changed.

The predetermined amplitude "a" is constant for all variations in the output signal and is determined by the voltage drops across diode 13 and the base-emitter junction of transistor 12 when conductive, and the predetermined amplitude "a" can be varied by varying the voltage drop along the branch of the circuit from the junction of capacitor 10 and resistor 11 to the reference potential through transistor 12. Preferably, the predetermined amplitude "a" is approximately one-third of the maximum amplitude of the output signal $X_R$ in order to permit the system to directly respond to normal load conditions, such as road level.

The voltage divider 9 is essentially a differentiator in that the voltage at the junction of capacitor 10 and resistor 11 experiences the step increase A initially since the voltage across capacitor 10 cannot change instantaneously and thereafter exponentially decreases as the capacitor 10 is charged. The transistor 12 inverts the voltage at the junction of capacitor 10 and resistor 11 to produce the exponentially increasing integrated signal $X_{R1}$ supplied to the control device 5. As noted above, the selective delay circuit 8 can be formed of any desired circuit configuration, such as a bootstrap circuit or a Miller integrator, and is not limited to the specifically described circuit even though such circuit is advantageous due to its simplicity, low cost and ease of adjustment of the prdetermined amplitude "a".

Inasmuch as the present invention is subject to many variations, modifications and changes in detail, it is intended that all subject matter described above or shown in the accompanying drawings be interpreted as illustrative and not in a limiting sense.

What is claimed is:

1. A system for regulating the traveling speed of a motor vehicle comprising
   comparator means for comparing an electrical sensed speed signal representative of the actual traveling speed of a motor vehicle and an electrical reference speed signal representative of a desired traveling speed of the motor vehicle and producing an output signal corresponding to the difference between said sensed speed signal and said reference speed signal;
   control means responsive to said output signal for controlling the traveling speed of the motor vehicle; and
   selective delay circuit means coupled between said comparator means and said control means for delaying the supply of said output signal to said control means when the amplitude of said output signal is above a predetermined level and for supplying said output signal directly to said control means when the amplitude of said output signal is below said predetermined level whereby a smooth transition is provided when the desired speed is changed.

2. A system for regulating the traveling speed of a motor vehicle as recited in claim 1 wherein said selective delay circuit means includes a capacitor and resistor connected in series between an input for said control device and a reference potential and a transistor having a base coupled with the junction of sad capacitor and said resistor, an emitter connected with said reference potential and a collector connected with said input of said control device.

3. A system for regulating the traveling speed of a motor vehicle as recited in claim 1 wherein said selective delay circuit means includes a differentiator and an inverting amplifier receiving an output of the differentiator to produce an integrated signal.

4. A system for regulating the traveling speed of a motor vehicle as recited in claim 1 wherein said comparator means includes an operational amplifier having a maximum amplitude output and said predetermined amplitude is substantially one-third of said maximum amplitude.

5. A system for regulating the traveling speed of a motor vehicle as recited in claim 1 wherein said selective delay circuit includes means for gradually increasing the input to said control device when said output signal is above said predetermined level.

* * * * *